(12) United States Patent
Tomsa

(10) Patent No.: US 10,563,698 B2
(45) Date of Patent: Feb. 18, 2020

(54) BEARING ASSEMBLY WITH AN INTEGRATED SEAL

(71) Applicant: SCHAEFFLER TECHNOLOGIES AG & CO. KG, Herzogenaurach (DE)

(72) Inventor: Peter Tomsa, Clarkston, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/113,649

(22) Filed: Aug. 27, 2018

(65) Prior Publication Data

US 2019/0072133 A1 Mar. 7, 2019

Related U.S. Application Data

(60) Provisional application No. 62/554,418, filed on Sep. 5, 2017.

(51) Int. Cl.
*F16C 33/78* (2006.01)
*F16C 19/46* (2006.01)
*F16C 19/36* (2006.01)

(52) U.S. Cl.
CPC ......... *F16C 33/7823* (2013.01); *F16C 19/36* (2013.01); *F16C 19/466* (2013.01); *F16C 33/7809* (2013.01); *F16C 33/7886* (2013.01)

(58) Field of Classification Search
CPC ........ F16C 19/46; F16C 19/463; F16C 19/48; F16C 19/466; F16C 19/44; F16C 35/077; F16C 33/7809; F16C 33/586; F16C 33/7886; F16C 33/7823; F16C 33/783; F16C 19/36; F16J 15/16; F16J 15/3268; F16J 15/3276
See application file for complete search history.

(56) References Cited

U.S. PATENT DOCUMENTS

| | | | | |
|---|---|---|---|---|
| 1,995,838 A | * | 3/1935 | Buckwalter | F16C 19/364 277/352 |
| 2,022,252 A | * | 11/1935 | Miltenberger | F16C 33/7886 277/500 |
| 2,274,187 A | * | 2/1942 | Buckwalter | B61F 15/14 384/459 |

(Continued)

FOREIGN PATENT DOCUMENTS

| | | | |
|---|---|---|---|
| DE | 4238147 A1 | 5/1994 | |
| JP | 2004293618 A | * 10/2004 | ............ F16C 19/466 |

OTHER PUBLICATIONS

Machine Translation of JP-2004293618-A (Year: 2004).*

(Continued)

*Primary Examiner* — Alan B Waits
(74) *Attorney, Agent, or Firm* — Brooks Kushman, P.C.

(57) ABSTRACT

A bearing assembly for a shaft comprises an outer shell including first and second radial walls axially spaced apart from each other and joined by a circumferential wall. A sealing element is disposed in the outer shell and includes a body portion in sealing engagement with the first radial wall or the circumferential wall of the outer shell. The sealing element includes a lip portion protruding radially inward from the body portion. The lip portion is arranged to sealingly engage the shaft. A bearing is press fitted in the outer shell between the sealing element and the second radial wall of the outer shell.

19 Claims, 3 Drawing Sheets

(56) References Cited

U.S. PATENT DOCUMENTS

| | | | | |
|---|---|---|---|---|
| 2,383,727 | A * | 8/1945 | Lewis | F16C 19/46 29/898.062 |
| 2,647,808 | A * | 8/1953 | Spurgeon | F16C 33/7886 277/353 |
| 3,206,829 | A * | 9/1965 | Schaeffler | F16C 33/7809 277/551 |
| 3,348,889 | A * | 10/1967 | Schaeffler | F16C 19/46 29/898.1 |
| 3,395,953 | A * | 8/1968 | Pitner | F16C 19/466 277/551 |
| 3,469,063 | A * | 9/1969 | Van Dorn | B23K 11/14 219/93 |
| 3,501,210 | A * | 3/1970 | Deutsch | F16C 33/60 384/564 |
| 3,539,232 | A * | 11/1970 | Batt | F16C 23/08 384/473 |
| 3,710,471 | A * | 1/1973 | Pitner | F16C 19/46 29/898.066 |
| 3,844,010 | A * | 10/1974 | Frost | F16C 33/80 228/110.1 |
| 3,998,505 | A * | 12/1976 | Frost | F16C 13/006 384/510 |
| 4,692,826 | A | 9/1987 | Raj et al. | |
| 4,854,751 | A * | 8/1989 | Grassmuck | F16C 27/066 384/537 |
| 5,385,413 | A * | 1/1995 | Murphy | F16C 33/588 384/564 |
| 5,419,641 | A * | 5/1995 | Fujinami | F16C 19/466 384/470 |
| 5,533,815 | A * | 7/1996 | Schierling | F16C 27/066 192/207 |
| 5,636,808 | A * | 6/1997 | Colin | E04H 4/101 242/395 |
| 6,517,251 | B1 * | 2/2003 | Williams | B29C 45/1459 384/488 |
| 8,505,706 | B2 * | 8/2013 | Horling | B65G 39/09 193/37 |
| 2001/0006566 | A1 * | 7/2001 | Akamatsu | F16C 19/46 384/559 |
| 2005/0196082 | A1 | 9/2005 | Asfour et al. | |
| 2005/0261141 | A1 * | 11/2005 | Iso | B82Y 30/00 508/154 |
| 2006/0090344 | A1 * | 5/2006 | Suzuki | F16C 19/46 29/898.065 |

OTHER PUBLICATIONS

PTFE Seals, http://www.oeminternational.com/products-seals-radial-shaft-ptfe-lip.html, ISO 9001:20080 Certified, OEM International, Inc., New Jersey, 2 pages.

* cited by examiner

BEARING ASSEMBLY WITH AN INTEGRATED SEAL

CROSS-REFERENCE TO RELATED APPLICATIONS

This application claims the benefit of U.S. provisional application Ser. No. 62/554,418 filed on Sep. 5, 2017, the disclosure of which is hereby incorporated in its entirety by reference herein.

TECHNICAL FIELD

The present disclosure relates generally to the field of seals, and more specifically, to seals used with bearings in high pressure fluid environments.

BACKGROUND

Seals are used with bearings to protect the bearings and other bearing components located in the interior of the bearing.

SUMMARY

Example aspects broadly comprise a bearing assembly for a shaft having an outer shell including first and second radial walls axially spaced apart from each other and joined by a circumferential wall. A sealing element is disposed in the outer shell and includes a body portion in sealing engagement with the first radial wall or the circumferential wall of the outer shell. The sealing element includes a lip portion protruding radially inward from the body portion, wherein the lip portion is arranged to sealingly engage the shaft. A bearing is press fitted in the outer shell between the sealing element and the second radial wall of the outer shell.

Other example aspects broadly comprise a method for manufacturing a bearing assembly that includes forming an outer shell including first and second radial walls axially spaced apart from each other and joined by a circumferential wall. The method also includes installing a sealing element in the outer shell such that a body portion of the sealing element is in sealing engagement with the first radial wall or the circumferential wall of the outer shell. The method further includes press fitting a bearing in the outer shell between the sealing element and the second radial wall of the outer shell.

Further example aspects broadly comprise a bearing assembly including an outer shell including a first radial wall and a bearing received in the outer shell. The bearing has an outer ring with a second radial wall opposite the first radial wall. A seal of the bearing includes a body portion sandwiched between the first and second radial walls and a lip portion protruding radially inward from the body portion and extending past the bearing.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. Unless defined otherwise, all technical and scientific terms used herein have the same meaning as commonly understood to one of ordinary skill in the art.

In general, seals may be used to protect bearings and their interior components. For example, seals may be used to protect bearings in high and low pressure fluid environments in devices such as transmissions. However, axial space in transmissions, and like devices, are becoming increasingly limited. As such, there is a need to provide bearing seals that perform in high pressure areas or combined low and high pressure areas that meet these axial constraints. Embodiments of the present disclosure provide a bearing assembly and method of making the same that provides an integrated solution where a seal is integrated into the bearing assembly to save axial space. The embodiments disclosed provide various advantages such as axial space savings and a reduction in manufacturing and assembly costs.

Figure 1:
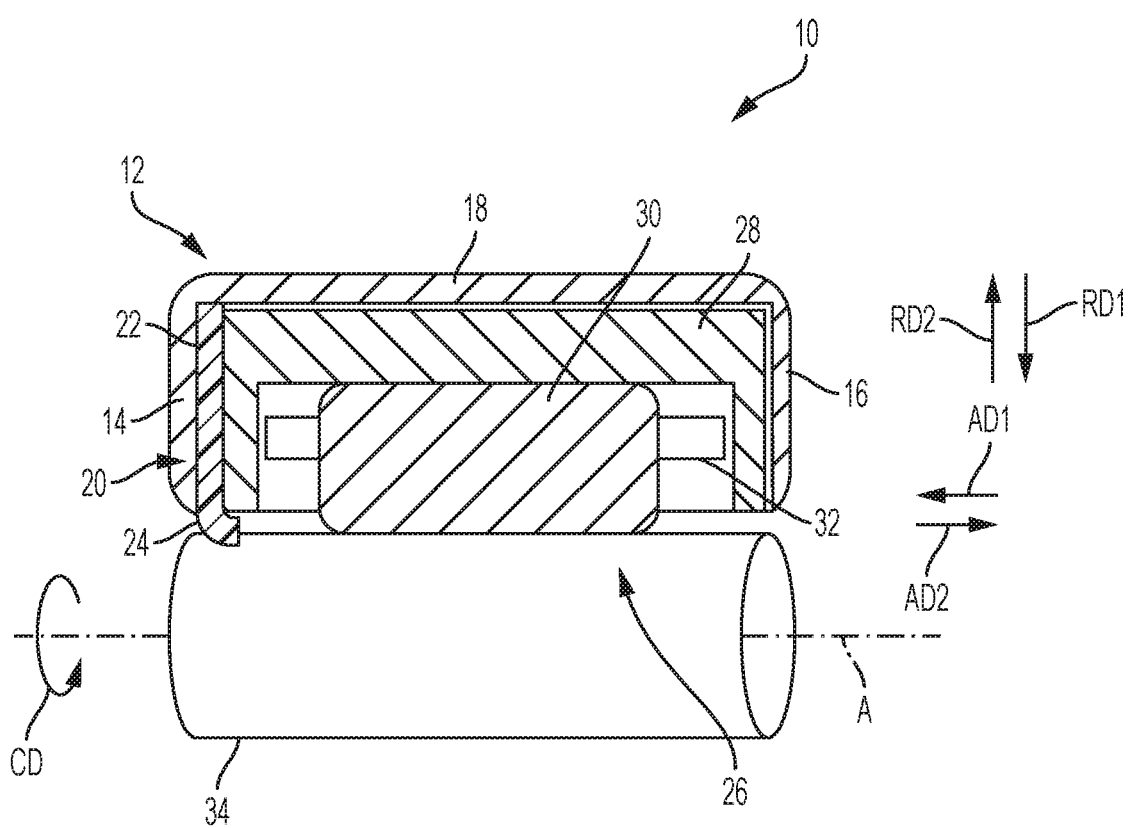
FIG. 1 is a partial section view of a bearing assembly with an integrated sealing element according to an example aspect of the disclosure.

The following description is made with reference to FIG. 1. FIG. 1 is a partial top half section view of a bearing assembly 10 with an integrated sealing element 20 according to an example aspect of the disclosure. Bearing assembly 10 is rotatable about an axis of rotation A in a circumferential direction CD. Bearing assembly 10 includes an outer shell 12 having a first radial wall 14 axially spaced apart from a second radial wall 16, wherein the first radial wall 14 and the second radial wall 16 are joined by a circumferential wall 18. Outer shell 12 may be a drawn cup having a cup-shaped enclosure or similar structure. The outer shell 12 may be thin-walled or thin-sectioned having a predetermined thickness to minimize and/or reduce the amount of axial space taken up by the outer shell 12. For example, the first radial wall 14, second radial wall 16, or circumferential wall 18 may have a thickness between the range of 0.2 mm and 1 mm.

A sealing element (seal) 20 is disposed in the outer shell 12. The sealing element 20 includes a body portion 22 in sealing engagement with the first radial wall 14 and/or the circumferential wall 18 (or at least a portion thereof) of outer shell 12. The sealing element 20 body portion 22 may have an axial width of at least 1 mm, for example, to provide proper sealing of the bearing assembly 10. Sealing element 20 also includes a lip portion 24 protruding radially inward in a first radial direction RD1 from the body portion 22 of sealing element 20, wherein the lip portion 24 is arranged to sealingly engage shaft 34. By radially protruding, it is meant that lip portion 24 extends at least partially radially inward in a first radial direction RD1. First radial direction RD1 and second radial direction RD2 are orthogonal to axis of rotation A. The lip portion 24 of sealing element 20 may be integrally formed with the body portion 22. That is, lip portion 24 and body portion 22 are formed from the same piece of material. Lip portion 24 of sealing element 20 extends axially away from the first radial wall 14 and toward the second radial wall 16 of outer shell 12. That is, lip portion 24 extends in axial direction AD2 opposite axial direction AD1, which is parallel to the axis of rotation A. Positioning lip portion 24 to face inwards and extend in axial direction AD2 may have various advantages such as preventing displacement of the lip portion 24 during applications where increased levels of pressure occur. However, although lip portion 24 extends axially away from the first radial wall 14 in FIG. 1, other embodiments (not shown) may include the lip portion 24 extending axially toward the first radial wall 14 depending on the particular application. That is, lip portion 24 may extend in axial direction AD1 opposite AD2. Moreover, even though only one lip portion 24 of sealing element 20 is shown, other embodiments (not shown) may include multiple lip portions depending on the particular application.

The sealing element 20 may be manufactured by injection molding and comprised of a material capable of withstanding high pressure fluid environments and applications. For example, the sealing element 20 may be comprised of a fluorocarbon polymer material such as Polytetrafluoroethylene (PTFE). Under higher pressure, it is important to select appropriate seal materials because the sliding contact area between the seal lip and the shaft will generate much higher friction, heat, and wear of the seal lip than in low pressure systems, which can cause premature or catastrophic seal failure in a very short period of time when using seals not specifically designed for higher pressures. Moreover, an inside diameter of the sealing element 20 lip portion 24 is smaller than an outer diameter of the shaft 34 it is in contact with to ensure a proper interference fit or contact between the sealing element 20 lip portion 24 and the shaft 34.

Bearing assembly 10 further includes a bearing 26 disposed in the outer shell 12 and arranged between the sealing element 20 and the second radial wall 16 of the outer shell 12. In particular, bearing 26 may be press fit in the outer shell 12 between sealing element 20 and radial wall 16. That is, bearing 26 is compressively fitted into outer shell 12 of bearing assembly 10 such that sealing element 20, and in particular, body portion 22 is compressed between first radial wall 14 and bearing 26 or outer ring 28 of bearing 26. This ensures that sealing element 20 remains sealingly engaged with outer shell 12 and retained in bearing assembly 10. Bearing 26 may include an outer ring 28, at least one roller element 30 disposed within the outer ring 28, and a cage 32 configured to rotatably retain the at least one roller element 30 in the outer ring 28. Cage 32 is further configured to maintain a desired peripheral spacing and axial positioning of the roller element 30 in outer ring 28. Although bearing 26 is shown as a roller bearing, other applications may exist and should be considered within the scope of this disclosure. For example, bearing 26 may be a radial bearing or an axial bearing. Example bearings may include a ball bearing, needle bearing, tapered roller bearing, or spherical roller bearing.

Figure 2:
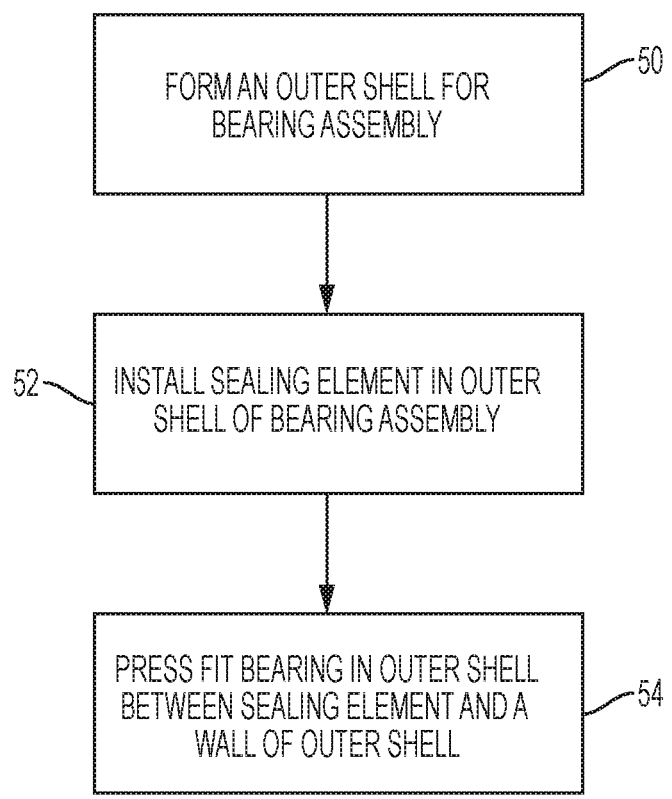
FIG. 2 is a flow chart illustrating a method of manufacturing a bearing assembly with an integrated sealing element according to another example aspect of the disclosure.

The following description is made with reference to FIG. 2. FIG. 2 is a flow chart illustrating a method of manufacturing a bearing assembly with an integrated sealing element according to another example aspect of the disclosure. The method includes forming an outer shell including first and second radial walls axially spaced apart from each other and joined by a circumferential wall, as described in block 50. The first radial wall, the second radial wall, or the circumferential wall of the outer shell may be formed to have a thickness between 0.2 mm and 1 mm. The method also includes installing a sealing element in the outer shell such that a body portion of the sealing element is in sealing engagement with the first radial wall and the circumferential wall of the outer shell, as described in block 52. The method further includes press fitting a bearing in the outer shell between the sealing element and the second radial wall of the outer shell, as described in block 54. That is, the bearing is compressively fitted into the outer shell of the bearing assembly such that the sealing element is compressed between the outer shell and bearing. This ensures that the sealing element remains sealingly engaged with the outer shell and retained within the bearing assembly.

Figure 3:
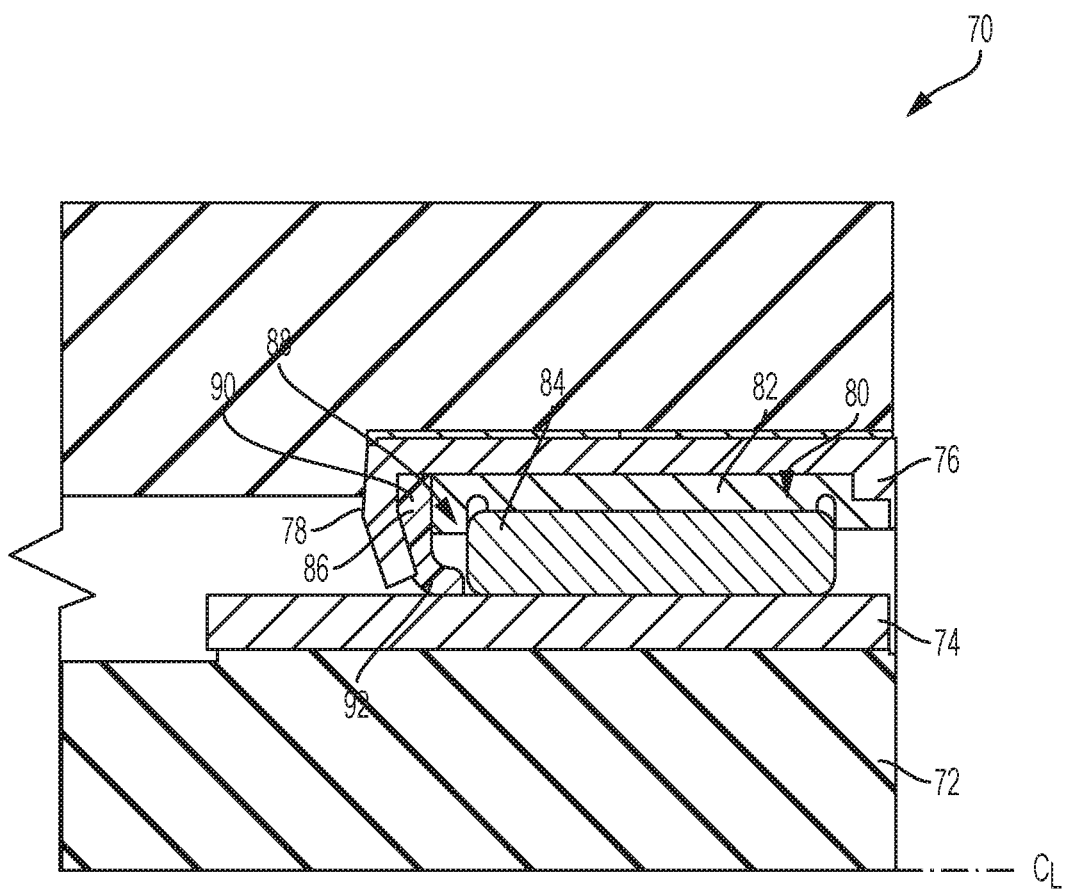
FIG. 3 is a partial section view of a bearing assembly with an integrated sealing element according to another example aspect of the disclosure.

Referring to FIG. 3, a bearing assembly 70 may be used to in conjunction with a shaft 72. The bearing assembly 70 may similar to bearing assembly 10, but includes an inner ring 74 that is press fit on the shaft 72 rather than having the rollers directly engage the shaft 72. The bearing assembly 70 may include an outer shell 76 that may be similar to the outer shell 12. The outer shell 76 has a radial wall 78. A bearing 80 may be press fit into the outer shell 76. The bearing 80 may include an outer ring 82, the inner ring 74, and a plurality of rollers 84 disposed therebetween. The rollers 84 may be needle bearings, ball bearings, or the like. The inner ring 74 may be press fit on the shaft 72 to create an oil-tight seal between the inner ring 74 and the shaft 72.

A sealing element 86 is configured to create an oil-tight seal between the outer shell 76 and the inner ring 74 to prevent oil flow though the bearing 80. The outer ring 82 may include a radial wall 88 that is adjacent to the radial wall 78 and spaced apart so that a body portion 90 of the sealing element 86 can be sandwiched between the radial walls 78, 88. The body portion 90 may be compressed between the radial walls 78, 88 to retain the sealing element 86 to the bearing assembly 70.

The body portion 90 extends radially inward towards the inner ring 74. A lip portion 92 of the sealing element 86 may be integrally formed with the body portion 90. The lip portion 92 of the sealing element 86 may extend axially away from the radial wall 78. Positioning the lip portion 92 to face inwards and extend axially may have various advantages as previously explained. The lip portion 92 is configured to engage with the outer surface of the inner ring 74 to seal the bearing 80. The material of the sealing element 86 and the manufacturing process may be the same as those previously described. While illustrated as having a single sealing element, a second sealing element may be provided on the other end of the bearing assembly 70.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST bearing assembly 10
outer shell 12
first radial wall 14
second radial wall 16
circumferential wall 18
sealing element 20
body portion 22
lip portion 24
bearing 26
outer ring 28
roller 30
cage 32
shaft 34
bearing assembly 70
shaft 72
inner ring 74
outer shell 76
radial wall 78
bearing 80
outer ring 82
roller 84
sealing element 86
radial wall 88
body portion 90
lip portion 92

What is claimed is:

1. A bearing assembly for a shaft, comprising:
a cup-shaped outer shell including a circumferential wall, a first wall extending radially inward from a first end of the circumferential wall, and a second wall extending radially inward from a second end of the circumferential wall, the first and second walls being axially spaced apart from each other by a first axial distance;
a sealing element disposed in the outer shell and including:
a body portion in sealing engagement with the first wall and having an unloaded axial thickness, and
a lip portion protruding radially inward from the body portion, wherein the lip portion is arranged to sealingly engage with the shaft; and
a bearing including an outer ring having an axial length and at least one roller element disposed within the outer ring, wherein the first axial distance is less than the unloaded axial thickness plus the axial length so that the body portion is compressed in the outer shell between the outer ring and the first wall of the outer shell, wherein the sealing element is retained by the body portion only being compressed between the first wall and the outer ring.

2. The bearing assembly of claim 1, wherein the bearing is press fit in the outer ring such that the body portion is compressed.

3. The bearing assembly of claim 1, wherein the first and second walls are orthogonal to an axial centerline of the bearing assembly.

4. The bearing assembly of claim 1, wherein the lip portion is integrally formed with the body portion.

5. The bearing assembly of claim 1, wherein the lip portion extends axially away from the first radial wall and toward the second radial wall.

6. The bearing assembly of claim 1, wherein an inside diameter of the lip portion is smaller than an outer diameter of the shaft.

7. The bearing assembly of claim 1, wherein the bearing is one of a ball bearing, a needle bearing, a tapered roller bearing, and a spherical roller bearing.

8. The bearing assembly of claim 1, wherein the sealing element is comprised of a fluorocarbon polymer material.

9. The bearing assembly of claim 8, wherein the fluorocarbon polymer material is PTFE.

10. A method for manufacturing a bearing assembly for a shaft, comprising:
forming an outer shell including first and second radial walls joined to and extending orthogonal from a circumferential wall such that the first and second walls are axially spaced apart from each other by a first axial distance;
installing a sealing element in the outer shell such that a body portion of the sealing element is in sealing engagement with the first radial wall, wherein the body portion has an unloaded axial thickness; and
press fitting a bearing, having an outer ring with an axial length, in the outer shell such that the body portion is compressed between the bearing and the first radial wall to retain the sealing element, wherein the body portion is only compressed due to the first axial distance of the outer shell being less than the unloaded axial thickness plus the axial length.

11. The method of claim 10, wherein the sealing element further includes a lip portion protruding radially inward from the body portion and being arranged to sealingly engage the shaft.

12. The method of claim 10, wherein the outer shell is formed in a cup shape with a second radial wall spaced apart from the first radial wall.

13. The method of claim 10, wherein the outer shell is formed to have a thickness between 0.2 mm and 1 mm.

14. The method of claim 10 further comprising installing the bearing assembly on the shaft such that the sealing element sealingly engages the shaft.

15. A bearing assembly comprising:
a cup-shaped outer shell supported on a bearing axis, the outer shell including a circumferential wall, a first wall extending radially inward from a first end of the circumferential wall, and a second wall extending radially inward from a second end of the circumferential wall, wherein the first and second walls are orthogonal to the bearing axis and are axially spaced apart from each other by a first axial distance;

a bearing received in the outer shell and including an outer ring having an axial length and a third wall facing the first wall; and a seal including a body portion having an unloaded axial thickness and a lip portion protruding radially inward from the body portion and extending past the bearing, wherein the body portion is sandwiched between the first and third walls such that the body portion is only compressed therebetween due to the first axial distance being less than the unloaded axial thickness plus the axial length.

16. The bearing assembly of claim 15, wherein the bearing further includes an inner ring and rollers interposed between the inner and outer rings, wherein the lip portion sealingly engages the inner ring.

17. The bearing of claim 15, wherein the bearing is press fit in the outer shell.

18. The bearing of claim 15, wherein the seal is comprised of a fluorocarbon polymer material.

19. The bearing of claim 15, wherein the bearing further includes rollers configured to ride directly on a shaft, and wherein the lip portion is configured to sealingly engage the shaft.

* * * * *